Patented July 13, 1948

2,445,221

UNITED STATES PATENT OFFICE 2,445,221

HYDRAULIC REMOVAL OF GEL

Paul D. Isanogle and Mahlon H. Replogle, Baltimore, Md., assignors to The Davison Chemical Corporation, Baltimore, Md.

Application June 21, 1944, Serial No. 541,440

4 Claims. (Cl. 252—359)

This invention relates to the manufacture of hydrogel and more particularly has reference to the removal of a hydrogel from a vessel in which a hydrosol is converted into a hydrogel.

In the manufacture of a hydrogel, such as silica hydrogel, a hydrosol formed by mixing sodium silicate and sulphuric acid, for instance, may be run into a vessel and allowed to set into a hydrogel. After sufficient setting time has elapsed the hydrogel may be dug out of the setting vessel and transferred to a washing tank for the removal of the soluble compounds such as sodium sulfate from the gel. The prior art methods of removing the gel from the setting vessel have quite often resulted in considerable damage to the gel and in the production of a large percentage of unusable fines. Moreover, the prior art methods of gel removal have not been as efficient and effective as is desirable, maintaining the cost of the gel product higher than is necessary.

An object of this invention is to provide a method and apparatus for removing a hydrogel from a vessel in which a hydrosol is gelled.

Another object of this invention is to provide a method and apparatus for hydraulically removing a hydrogel from a vessel in which a hydrosol is converted into a hydrogel.

A further object of this invention is to provide a method and apparatus for removing a hydrogel from a vessel, in which a hydrosol is gelled, by setting the gel about cores positioned over openings in the bottom of the vessel and playing a stream of water onto the surface of the gel to break up and sluice the same down through a channel provided by removal of the core and through the opening in the bottom of the vessel.

Still another object of this invention is to provide a method and apparatus for removing a hydrogel from a vessel in which a hydrosol is gelled by setting the gel about cores positioned over openings in the bottom of the vessel by introducing a stream of water into the gel at a point remote from said opening and causing the water to flow through cracks in the hydrogel to the channel provided by removal of the core and thence through the opening in the bottom of the vessel, the flow of water causing the hydrogel to break up and follow the same to said opening.

It is also an object of this invention to provide a method for removing a core from a hydrogel set about the core by positioning a smaller auxiliary core adjacent the first-mentioned core which is removed prior to removal of the main core.

Other objects will appear more fully from the description set forth hereinafter and as indicated in the accompanying drawings.

In order to facilitate an understanding of the present invention, reference is made to the accompanying drawings, in which.

Figure 1:
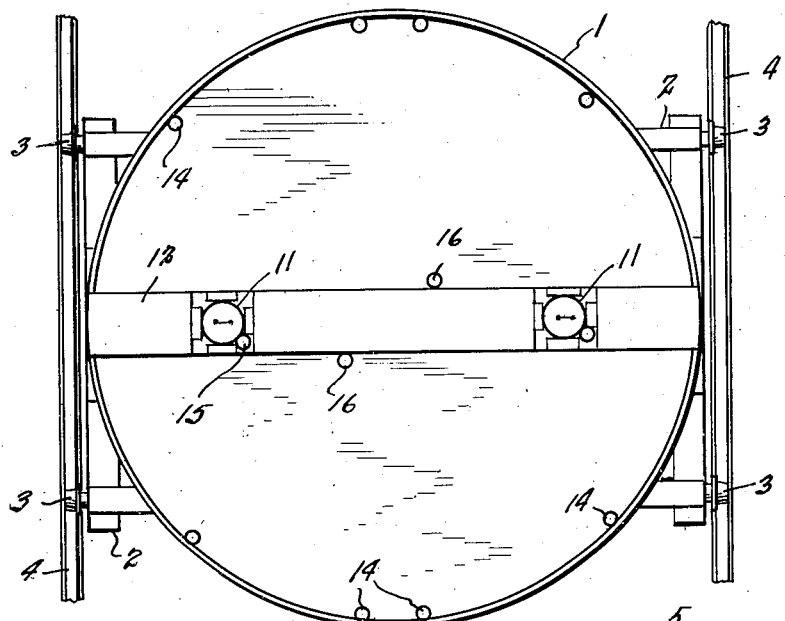
Figure 1 is a plan view of a setting vessel constructed in accordance with the present invention.

In carrying out the present invention, a hydrosol which may be prepared by mixing sodium silicate and sulfuric acid is introduced into a setting vessel 1. As indicated in the drawings, the setting vessel 1 may be of circular formation and mounted upon a carriage 2 which is provided with flange wheels 3 adapted to run on the track 4. For purposes of the present invention, the setting vessel 1 has been illustrated as being mounted on the carriage 2 for movement along the rails 4, which is an advantage in a commercial installation because a single setting vessel may be used for introducing a hydrogel into a plurality of wash tanks positioned below the level of the rails 4 and in alignment therewith. On the other hand, however, the present invention is not limited to a setting vessel which is movable but is equally applicable to a stationary setting vessel of any desired cross sectional configuration.

The hydrosol which for purposes of illustration may be a silica hydrosol prepared from sodium silicate and sulfuric acid is introduced into the setting or gelling vessel 1 through a hose or other conduit 5. This hydrogel may be supplied to the conduit 5 from a source such as a mixer, not illustrated.

Figure 2:
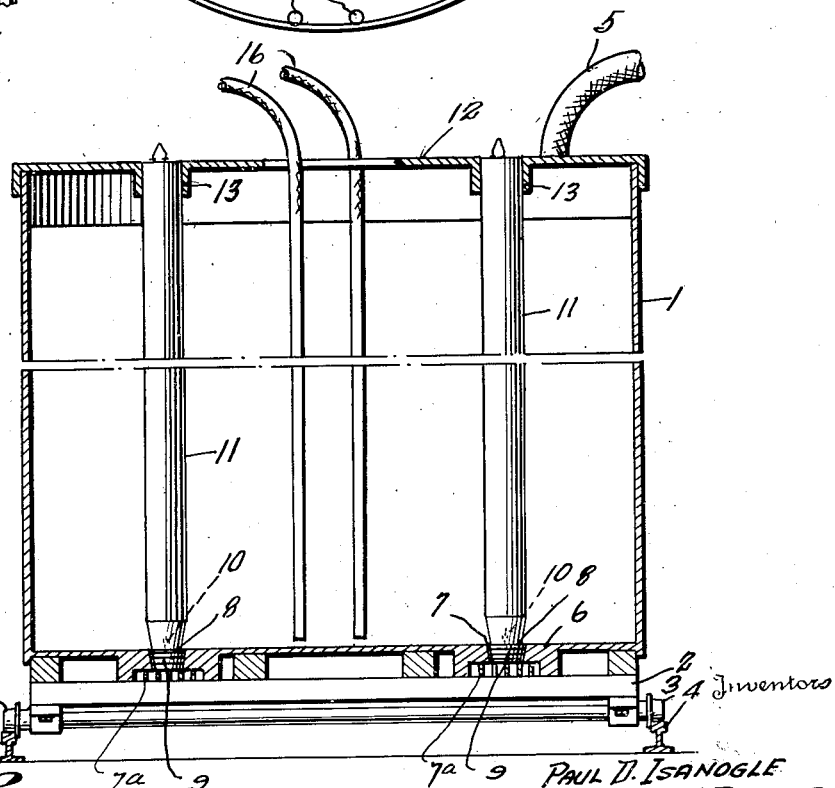
Figure 2 is a vertical sectional view of the setting vessel illustrated in Figure 1 of the drawings.

As illustrated in Figure 2 of the drawings, the bottom 6 of the setting vessel 1 is provided with one or more openings 7 which are closed by plugs 8. Openings 7 and plugs 8 are of tapered formation and the plugs 8 are provided with a plurality of sealing rings 9 to provide a leakproof joint when the plugs are in closed position. Plugs 8 are connected by chains 10 or other lost motion means with cores 11 which are positioned directly over the plugs 8 and exert their weight upon the plugs. Cores 11 extend from the plugs 8 up to the upper portion of the setting vessel 1 and are maintained in a truly vertical position in setting vessel 1 by means of a combined core guide and cat-walk 12. As illustrated, the cat-walk 12 is provided with openings 13 which are in vertical alignment with the openings 7 and through which the cores 11 are inserted when being placed in position over the openings 7.

The plugs 8 and the associated cores 11 are described in greater detail in the copending application of Thomas O. Tongue, Serial No. 539,165, filed June 7, 1944 (now Patent No. 2,443,282).

In operation, the vessel 1 is positioned as desired and the cores 11 and the associated plugs 8 are inserted through the openings 13 in the catwalk 12 and lowered down toward the bottom of the vessel 1. At this point the plugs 8 are properly inserted within the openings 7 and the weight of the cores 11, which are of metal construction and which may be filled with sand or other weighting materials, allowed to rest upon the plugs 8, thereby forcing the same into tight engagement with the walls of the openings 7. Upon completion of the closure of the openings 7 and the positioning of the cores 11, the hydrosol prepared as hereinbefore described is introduced through the conduit 5 into the vessel 1. After a desired quantity of the hydrosol is introduced into the vessel 1 the supply is shut off and the hydrosol is allowed to remain undisturbed in the vessel 1 for a predetermined period of time until gellation of the hydrosol is effected.

When the hydrosol has set into a hydrogel, the cores 11 are lifted upwardly by means of a suitable hoisting mechanism and after they have been raised a predetermined distance the plugs 8 which are connected to the cores 11 by means of a chain 10 or other lost motion connection are pulled from the openings 7. Upon removal of the cores 11 and the plugs 8 there will be provided a channel down through the hydrogel in the space from which the core was removed and this channel will communicate with the opening 7 directly beneath the same. By playing one or more streams of water upon the upper surface of the hydrogel, particles of the gel are broken away from the mass in the vessel 1 and are sluiced down through the channels in the gel through the openings 7 into a tank over which the setting vessel 1 is positioned. We have termed this procedure for the removal of the gel from the mass in the setting vessel, "cascading removal of the gel." The stream or streams of water which are introduced in large volume cuts the hydrogel into smaller pieces and sluices the same down through the channels. This particular method of removal is effective on a relatively strong hydrogel.

In accordance with the present invention another method of hydraulically removing the hydrogel from the vessel is to introduce one or more streams of water into the setting vessel 1 adjacent the periphery thereof. By directing the streams of water down toward the bottom of the gel, small channels will be cut and the water so introduced will find its way through cracks in the hydrogel toward the channels provided by removal of the cores 11. After the water has been introduced adjacent the periphery for a length of time, the whole mass of gel will break up and can be easily sluiced out through the channels and down through the openings 7 and grizzly or sizing screen 7a.

In some instances, it has been found desirable to provide the mass of gel with a plurality of small channels adjacent the periphery thereof. These channels may be formed by positioning a plurality of small auxiliary cores 14 at various positions adjacent the periphery of the vessel 1. These cores while being of a cross section large enough to permit the insertion of a small hose or conduit down through the openings formed thereby are of a length to extend from the bottom of the vessel 1 up to a position above the surface of the hydrosol when the vessel is filled. When the auxiliary cores 14 are positioned in the vessel 1 and the hydrogel is set therein it is only necessary to exert a small lifting force on the auxiliary cores to remove the same from the gel. Then the hose or conduits 16 for introducing the water into the hydrogel adjacent the periphery of the vessel 1 may be positioned in the cored channels.

Another feature of the present invention resides in the provision of small auxiliary cores 15 which are juxtaposed in close relation to the cores 11 prior to introduction of the hydrosol into the vessel 1. By providing these small auxiliary cores 15 they may be fairly easily removed after the hydrosol has gelled and will afford openings down through the gel which will facilitate the removal of the main cores 11 by breaking the vacuum or suction created in attempting to remove the cores 11.

From the foregoing description, it will be appreciated that the present invention provides an apparatus and methods for hydraulically removing a hydrogel from a vessel in which it has set. These methods and the apparatus employed for carrying them out speed up and reduce the cost of removal of the hydrogel from the setting vessel.

We claim:

1. A method of setting hydrogel in and removing it from setting vessel having an opening in the central portion of the bottom thereof comprising positioning a core in the vessel extending upwardly from the opening, introducing a hydrosol into the vessel about said core, positioning auxiliary cores in said vessel near the side walls thereof and near the aforesaid core, extending from the bottom to above the level to which the vessel is filled with hydrosol, maintaining all of said cores in position until the hydrosol has set into a hydrogel, removing the auxiliary cores adjacent the opening to facilitate removal of the core over said opening, removing the core over the opening and the other cores, introducing a plurality of streams of water into the holes formed by the auxiliary cores to break up the hydrogel, and directing a stream of water onto the hydrogel mass to sluice broken up pieces of the hydrogel into the cored hole over the opening, and out through said opening.

2. A method of setting an inorganic hydrosol and cascading removing the resulting hydrogel from a setting vessel having a drain in the bottom thereof, comprising closing the drain, introducing an inorganic hydrosol into the vessel, setting the hydrosol to a hydrogel, forming a channel substantially vertically through the hydrogel to the bottom of the vessel to communicate with the drain, said hydrogel constituting the walls of said channel, opening the drain in the vessel, and directing a stream of water of large volume onto the mass of hydrogel to cut and break away pieces of the hydrogel from the mass, and sluicing the broken away pieces of hydrogel to the channel and down through said channel and out through the drain.

3. An apparatus for the setting of a hydrosol comprising a vessel having an opening in the bottom thereof, a closure for the opening, a main core, means for vertically positioning the main core on said closure, and at least one auxiliary core vertically juxtaposed in close relation to said core, said auxiliary core being smaller and more easily removed from a gel set in said vessel than the main core to facilitate removal of said main core.

4. An apparatus for the setting of a hydrosol comprising a vessel having an opening in the bottom thereof, a closure for the opening, a main core, means for vertically positioning the main core on said closure, at least one auxiliary core vertically positioned remote from said main core, said main core and auxiliary cores being removable from a hydrogel in the vessel to provide channels in the gel to facilitate removal of the gel from the vessel, and at least one auxiliary core vertically juxtaposed in close relation to the main core and of a smaller diameter whereby it is more easily removed from the hydrogel in said vessel to facilitate removal of the main core.

PAUL D. ISANOGLE.
MAHLON H. REPLOGLE.

REFERENCES CITED

The following references are of record in the file of this patent:

UNITED STATES PATENTS

| Number | Name | Date |
|---|---|---|
| 1,283,000 | Wallace | Oct. 29, 1918 |
| 1,358,662 | Wallace | Nov. 9, 1920 |
| 1,729,068 | Fischer | Sept. 24, 1929 |

FOREIGN PATENTS

| Number | Country | Date |
|---|---|---|
| 230,281 | Great Britain | Mar. 12, 1925 |
| 414,972 | Great Britain | Aug. 16, 1934 |
| 826,732 | France | Apr. 7, 1938 |